United States Patent [19]
Smith, Sr.

[11] Patent Number: 5,687,359
[45] Date of Patent: Nov. 11, 1997

[54] FLOATING POINT PROCESSOR SUPPORTING HEXADECIMAL AND BINARY MODES USING COMMON INSTRUCTIONS WITH MEMORY STORING A PAIR OF REPRESENTATIONS FOR EACH VALUE

[75] Inventor: Ronald Morton Smith, Sr., Wappingers Falls, N.Y.

[73] Assignee: International Business Machines Corporation, Armonk, N.Y.

[21] Appl. No.: 414,247

[22] Filed: Mar. 31, 1995

[51] Int. Cl.⁶ ............................................. G06F 7/38
[52] U.S. Cl. ................... 395/563; 364/748; 364/781; 364/784; 395/567; 395/570
[58] Field of Search ........................ 364/748, 781, 364/784; 395/375, 800, 563, 567, 570

[56] References Cited

U.S. PATENT DOCUMENTS

| | | |
|---|---|---|
| 4,161,784 | 7/1979 | Cushing et al. .................. 364/748 |
| 4,603,323 | 7/1986 | Hassitt et al. .................... 341/75 |
| 4,675,809 | 6/1987 | Omoda et al. .................... 395/375 |

*Primary Examiner*—Kenneth S. Kim
*Attorney, Agent, or Firm*—Lynn L. Augspurger

[57] ABSTRACT

A computer system having multiple floating point modes and common instructions for each mode in order to implement operations in a mode independent manner. A computer system includes two floating point modes supported by a common set of instructions for implementing operations, said instructions thereby being mode independent. The computer system includes a means for storing information for specifying the current floating point mode; and a floating point unit adapted to execute any one instruction from among the common set of instructions in accordance with the stored rounding mode and the operation associated with said instruction, thereby providing for mode independent operation. In an embodiment of the present invention, the floating point mode is either binary floating point or hexadecimal floating point.

5 Claims, 5 Drawing Sheets

| MNEMONIC | OP CODE | OPERANDS |
| --- | --- | --- |
| FBER | 'B338' | SHORT OPERAND, LONG RESULT |
| FBDR | 'B348' | LONG |

| MNEMONIC | OP CODE | OPERANDS |
| --- | --- | --- |
| THER | 'B33B' | SHORT OPERAND, LONG RESULT |
| THDR | 'B34B' | LONG |

| BYTE | BITS | VALUE | FUNCTION |
|---|---|---|---|
| 0 | 0<br>1<br>2<br>3<br>4<br>5-7 | | BFP-INVALID-DATA MASK<br>BFP-DIVISION-BY-ZERO MASK<br>BFP-OVERFLOW MASK<br>BFP-UNDERFLOW MASK<br>BFP-INEXACT MASK<br>(UNASSIGNED) |
| 1 | 0<br>1<br>2<br>3<br>4<br>5-7 | | BFP-INVALID-DATA FLAG<br>BFP-DIVISION-BY-ZERO FLAG<br>BFP-OVERFLOW FLAG<br>BFP-UNDERFLOW FLAG<br>BFP-INEXACT FLAG<br>(UNASSIGNED) |
| 2 | 0-7 | | DATA-EXCEPTION CODE (DXC) |
| 3 | 0<br>1-5<br>6-7<br><br><br><br> | <br><br><br>00<br>01<br>10<br>11 | QNAN MODE<br>(UNASSIGNED)<br>ROUNDING MODE<br>ROUND TO NEAREST<br>ROUND TO ZERO<br>ROUND UP<br>ROUND DOWN |

FIG.4

MNEMONIC R$_1$,R$_2$ [RRE]

| OP CODE | ///////// | R$_1$ | R$_2$ |
|---|---|---|---|
| 0 | 16 | 24 28 | 31 |

| MNEMONIC | OP CODE | OPERANDS |
|---|---|---|
| FHER | 'B33A' | LONG OPERAND, SHORT RESULT WITH 32 ZEROS APPENDED |
| FHDR | 'B34A' | LONG |

FIG.7A

MNEMONIC R$_1$,R$_2$ [RRE]

| OP CODE | ///////// | R$_1$ | R$_2$ |
|---|---|---|---|
| 0 | 16 | 24 28 | 31 |

| MNEMONIC | OP CODE | OPERANDS |
|---|---|---|
| TBER | 'B339' | LONG OPERAND, SHORT RESULT WITH 32 ZEROS APPENDED |
| TBDR | 'B349' | LONG |

FIG.7B

| INSTRUCTION | MNE-MONIC | CURRENT MODE | SOURCE | CONVERT? | TARGET |
|---|---|---|---|---|---|
| CONVERT FROM BFP | FBER | HFP | B S | YES | H LE |
| | | BFP | B S | NO | U,Z |
| | FBDR | HFP | B L | YES | H LE |
| | | BFP | B L | NO | U |
| CONVERT FROM HFP | FHER | HFP | H L | NO | U |
| | | BFP | H L | YES | B SR,Z |
| | FHDR | HFP | H L | NO | U |
| | | BFP | H L | YES | B LR |
| CONVERT TO BFP | TBER | HFP | H L | YES | B SR,Z |
| | | BFP | B S | NO | U,Z |
| | TBDR | HFP | H L | YES | B LR |
| | | BFP | B L | NO | U |
| CONVERT TO HFP | THER | HFP | H S | NO | U,Z |
| | | BFP | B S | YES | H LE |
| | THDR | HFP | H L | NO | U |
| | | BFP | B L | YES | H LE |

EXPLANATION:

B BINARY FLOATING-POINT (BFP)
E EXACT RESULT
H HEXADECIMAL FLOATING-POINT (HFP)
L LONG FORMAT (64 BITS)
R ROUNDED RESULT
S SHORT FORMAT (32 BITS)
T TRUNCATED RESULT
Z 32 ZEROS APPENDED TO SHORT FORMAT (64 BITS)
U SOURCE IS PLACED UNCHANGED IN THE TARGET

FIG.8

FLOATING POINT PROCESSOR SUPPORTING HEXADECIMAL AND BINARY MODES USING COMMON INSTRUCTIONS WITH MEMORY STORING A PAIR OF REPRESENTATIONS FOR EACH VALUE

FIELD OF THE INVENTION

The relates to computer systems and, more particularly, to a computer architecture providing hexadecimal and binary floating point modes and including instructions for implementing operations mode independently.

BACKGROUND OF THE INVENTION

In the ensuing description of the prior art and the present invention, the following are herein incorporated by reference:

"Enterprise Systems Architecture/390 Principles of Operation," Order No. SA22-7201-02, available through IBM branch offices, 1994;

"IEEE standard for binary floating-point arithmetic, ANSI/IEEE Std 754-1985," The Institute of Electrical and Electronic Engineers, Inc., New York, August 1985; and Commonly assigned U.S. patent application Ser. No. 08/414,250 to Eric Mark Schwarz, et al., filed Mar. 31, 1995, and entitled "Implementation of Binary Floating Point Using Hexadecimal Floating Point Unit".

Previous hardware implementations of floating-point arithmetic have provided various radixes, including binary, decimal, or hexadecimal. But only a single radix was supported in any particular implementation. As future machines are built, they must be compatible with previous machines, and must also provide support for new formats. A new requirement emerges to provide hardware support for more than one format. For example, there is a requirement to support both the IBM System/360 hexadecimal and the IEEE binary floating-point formats.

Providing a computer with both modes permits more flexibility in handling applications, and permits a smoother transition between old applications and data using one mode and new applications and data in the new mode. Several approaches to providing support for two floating-point formats can be considered. One approach would be to provide separate registers and instructions for each format. This approach would keep the problems of complexity and interaction between the two modes to a minimum, but it does not provide for the synergistic effects of an integrated solution.

In the hereinabove cited, commonly assigned U.S. Patent Application to Schwarz et al., a computer system is described, including a floating point processor unit, in which the same instructions and registers are used for two floating point formats, along with a mode to control which format is to be used. The two modes specifically described therein are the IBM S/390 hexadecimal floating-point (HFP) mode and the IEEE 754 binary floating-point (BFP) modes. The concept of mode independent code reduces the problems associated with compiler support of both modes and also permits program modules to be written which can be called in both modes. However, this also present several unique problems which must be solved.

For example, it may be appreciated that there will be applications which must operate on data in both types of formats and will also require conversions of data between the two modes. Also, it may be appreciated that in the mixed environment, it will be necessary to provide math libraries for both modes. In some cases, the exact sequence of code for the two modes will of necessity be different, but in other cases it may be possible and desirable to provide program modules which can operate in either mode.

It is recognized, therefore, that a computer system that provides multiple floating point modes presents unique problems in order to provide for mode-independent applications, and thus requires instructions for implementing operations to support veritable mode independent operation.

SUMMARY OF THE INVENTION

The present invention provides for mode-independent code in a computer system having multiple floating point modes. In an embodiment of the present invention, a computer system includes two floating point modes supported by a common set of instructions for implementing operations, said instructions thereby being mode independent. The computer system includes a means for storing information for specifying the current floating point mode; and a floating point unit adapted to execute any one instruction from among the common set of instructions in accordance with the stored rounding mode and the operation associated with said instruction, thereby providing for mode independent operation.

In an implementation, there is provided an instruction, referred to hereinbelow as the instruction LOAD MODAL CONSTANT, for implementing operation which loads either of two different 8-byte values from storage depending on the current floating-point mode. Thus, the program can set up a hexadecimal and a binary constant and load the appropriate value as a function of the current mode. All instructions added to solve special problems for the IEEE format are also defined to operate in the HFP mode and to provide consistent answers such that in most cases the output of a compiler can be independent of the mode. There is also provided in an embodiment of the present invention, instructions for implementing operations which convert between the BFP and HFP formats. These instructions, referred to hereinbelow as CONVERT FROM BFP, CONVERT FROM HFP, CONVERT TO BFP, and CONVERT TO HFP, are designed in such a way that the program can convert between data in a known format to data in the current format without requiring the program to be aware of what the current format is.

BRIEF DESCRIPTION OF THE DRAWINGS

Additional aspects, features, and advantages of the invention will be understood and will become more readily apparent when the invention is considered in the light of the following description made in conjunction with the accompanying drawings, wherein:

FIG. 4 illustrates the format of a floating-point-control (FPC) register, in accordance with an embodiment of the present invention;

FIG. 7A and FIG. 7B illustrate separate instructions for implementing a mode independent operation of converting a floating point number from HFP to BFP, in accordance with the present invention; and FIG. 8 summarizes the BFP-HFP instructions for implementing mode independent operations of converting a floating point number between HFP and BFP, in accordance with the present invention.

DETAILED DESCRIPTION OF THE INVENTION

Figure 1:
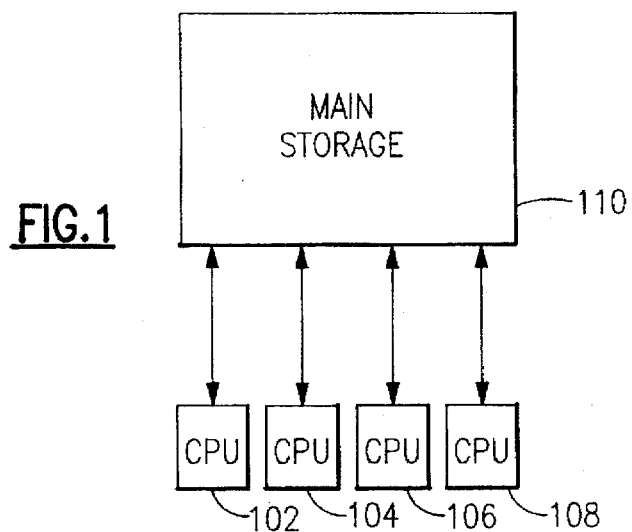
FIG. 1 illustrates a conventional shared memory computer system which may be employed to implement the present invention.
Figure 2:
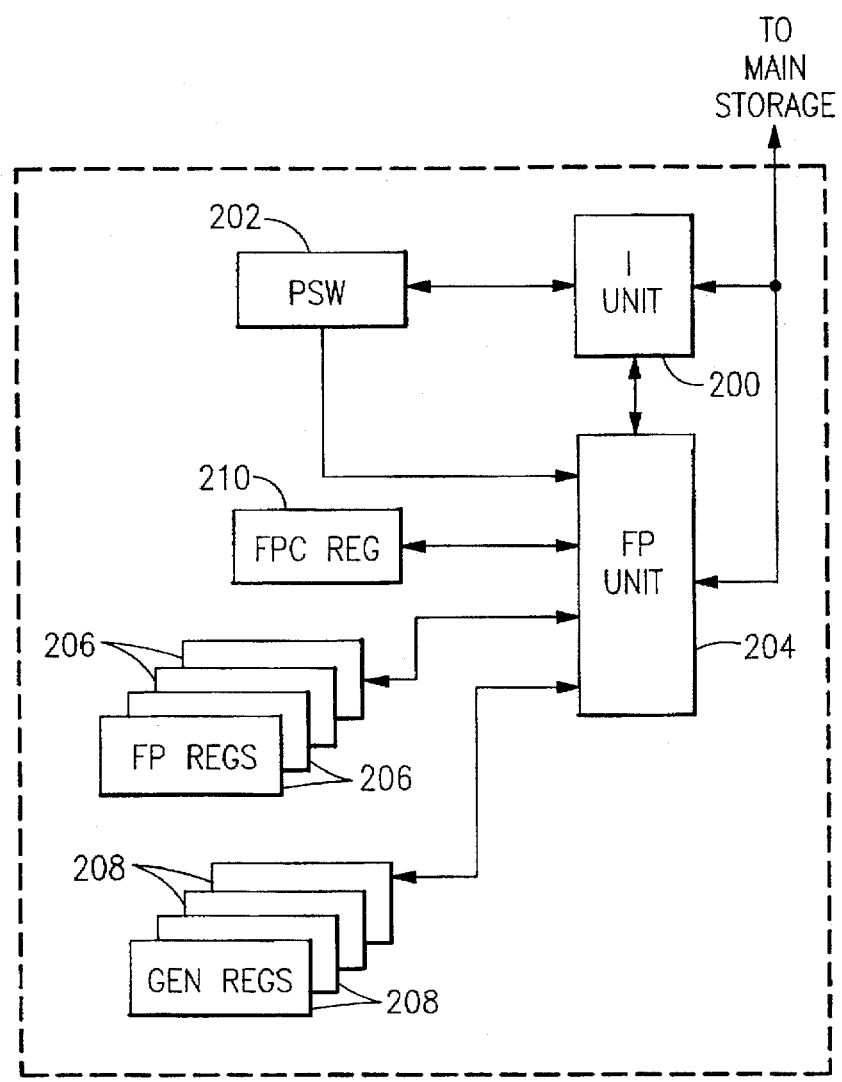
FIG. 2 schematically depicts functional components included in a CPU which may be employed in accordance with the present invention.

FIG. 1 illustrates a conventional shared memory computer system including a plurality of central processing units (CPUs) 102–108 all having access to a common main storage 110. FIG. 2 schematically depicts functional components included in a CPU from FIG. 1. Instruction unit 200 fetches instructions from common main storage 110 according to an instruction address located in the program status word (PSW) register 202, and appropriately effects execution of these instructions. Instruction unit 200 appropriately hands off retrieved floating point instructions to floating point processor unit 204, along with some of the operands that may be required by the floating point processor unit to execute the instruction. Floating point (FP) processor unit 204 includes all necessary hardware to execute the floating point instruction set, and preferably, in accordance with an embodiment of the present invention, supports both Binary and Hexadecimal floating point formats. FP processor unit 204 is coupled to floating point (FP) registers 206, which contain floating point operands and results associated with FP processor unit 204 processing, and is also coupled to general registers 208. FP processor unit 204 is also coupled to floating point control (FPC) register 210, which preferably includes mask bits in addition to those provided in the PSW, as well as bits indicating the floating point mode. In a multi-user application, FPC register 210 is under control of the problem state.

Figure 3:
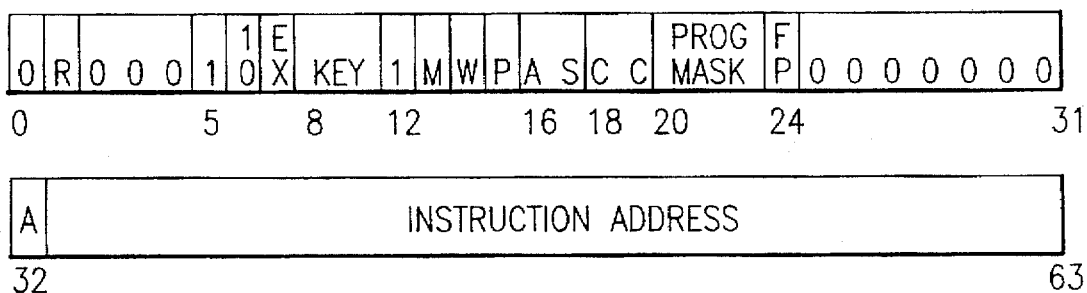
FIG. 3 illustrates the format of a 64 bit program status word (PSW), including a bit for indicating a binary or hexadecimal floating point mode, in accordance with an embodiment of the present invention.

FIG. 3 illustrates the format of a 64 bit PSW as stored in PSW register 202. In a multi-user application, the supervisor state saves the PSW for a given problem state when taking interruption to dispatch another problem state. It can be seen that PSW includes program mask bits 20–23.

FP-Mode Bit in PSW

Bit 24 of the PSW is the FP-mode bit. In accordance with an embodiment of the present invention whereby both binary and hexadecimal floating point modes are supported, when the bit is zero, the CPU is in the hexadecimal-floating-point (HFP) mode, and floating-point operands are interpreted according to the HFP format. When the bit is one, the CPU is the binary-floating-point (BFP) mode, and floating-point operands are assumed to be in the BFP format. Some floating-point instructions operate the same in either mode.

When an instruction is executed which is not available in the current FP mode, a special-operation exception is recognized.

FPC Register

As illustrated in detail by FIG. 4, the floating-point-control (FPC) register 210 is a 32-bit register, which contains the mode (i.e., rounding mode), mask, flag, and code bits. For this implementation, by way of example, the rounding mode is represented by the last to bits of the last byte. Round to nearest, round to zero, round up, and round down modes are supported.

A preferred system for practicing the present invention is further described in the above-cited, commonly assigned U.S. Patent Application to Schwarz et al., in which a floating point dataflow for an floating point processor unit implementing both IEEE 754 Binary and IBM S/390 Hexadecimal is shown. In accordance with the present invention, instructions are included that are common to HFP and BFP modes (e.g., one ADD instruction for both HFP and BFP), the instructions appropriately implementing an operation according to the current mode indicated by the current FP mode. A number of instructions, including LOAD FP INTEGER and several radix conversion instructions, are provided as examples of an embodiment of implementing and supporting mode independent operation according to the present invention, which is not limited thereto.

Figure 5:
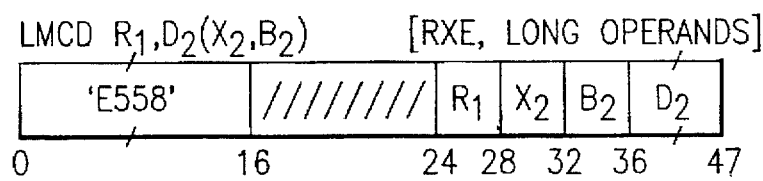
FIG. 5 illustrates the format of a LOAD Modal Constant mode independent instruction, in accordance with the present invention.

FIG. 5 illustrates the format of a LOAD Modal Constant instruction which may be executed by FP processor Unit 204. Execution of this instruction results in a first or second of a pair of operands (each representing the same numerical value, e.g., constant, but in different architected states, i.e., binary and hex) located in storage as addressed by the second operand (including a combination of a base address according to a value located in a register identified $B_2$ and an offset specified by $D_2$) being placed in the first-operand location $R_1$ which identifies a floating point register 206. In accordance with an embodiment of the present invention, the first of the pair is chosen if the current FP mode is HFP, and the second is chosen if the current mode is BFP, the mode being indicated by the FP-mode bit in PSW register 202. More particularly, in this implementation, the first of the pair of storage operands is located at address A and the second at A+8, where A is the second-operand address designated by the instruction.

The operation is performed without inspecting the contents of the second operand; no arithmetic exceptions are recognized. Access exceptions may or may not be recognized for the storage location of the operand that is not selected.

It may be appreciated, therefore, that the instruction LOAD MODAL CONSTANT simplifies writing mode-independent programs. It selects one of a pair of storage operands, depending on whether the FP mode is HFP or BFP. Thus, if the first of the pair is a constant in the HFP format and the second is the same number in the BFP format, the instruction will load the value appropriate for the current mode, so that it can be used by subsequent arithmetic operations. Accordingly, there is no need for separate instructions for loading either HFP or BFP constants, or for a programmer/program to know which mode is the current mode.

Radix Conversion

In accordance with an embodiment of the present invention, in order to provide mode independent support of HFP and BFP architectures, a number of radix conversion instructions are also included.

Figure 6A:
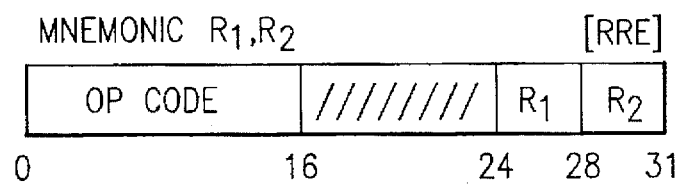
FIG. 6A and FIG. 6B illustrate separate instructions for implementing a mode independent operation of converting a floating point number from BFP to HFP, in accordance with the present invention.
Figure 6B:
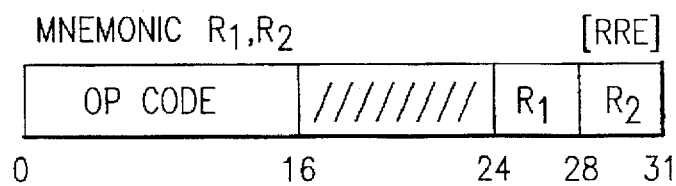

FIG. 6A and FIG. 6B illustrate separate instructions for implementing a mode independent operation of converting a floating point number from BFP to HFP, if necessary, according to the FP mode indicated by the FP-mode bit in PSW register 202.

If the floating-point radixe of source and target differ, the operand located in the second-operand location $R_2$ which identifies a floating point register 206 is convened from the binary floating-point (BFP) format to the hexadecimal floating-point (HFP) format, and the result normalized and rounded to zero (truncated), and then placed in the first-operand location $R_2$ which identifies a floating point register 206.

It is therefore understood that no conversion takes place if the current FP mode is BFP and the instruction is CONVERT FROM BFP, or if the current FP mode is HFP and the instruction is CONVERT TO HFP. Instead, the second operand is placed unchanged in the first-operand location, except that, for FBER and THER, the second operand is extended to fill the first-operand location by appending 32 zeros on the right.

The sign of the result is the sign of the second operand. If the second operand has a sign bit of one and all other operand bits are zeros, the result also is a one followed by all zeros.

When the conversion takes place and the characteristic of the hexadecimal intermediate result is negative, the final result is all zeros, but with the same sign as the second operand, and no exception is recognized.

Accordingly, it may be appreciated that a mode independent instruction is appropriately executed in accordance with the stored mode and the operation effected by the instruction.

FIG. 7A and FIG. 7B illustrate separate instructions for implementing a mode independent operation of converting a floating point number from HFP to BFP, if necessary, according to the FP mode indicated by the FP-mode bit in PSW register 202.

If the floating-point radixes of source and target differ, the operand located in the second-operand location $R_2$ which identifies a floating point register 206 is converted from the hexadecimal floating-point (HFP) format to the binary floating-point (BFP) format, and the result rounded according to the current rounding mode (e.g., as specified by the last two bits stored in the FPC register 210) binary floating-point (BFP) format to the hexadecimal floating-point (HFP) format, and the result normalized and rounded to zero (truncated), and the rounded result is then placed in the first-operand location $R_2$ which identifies a floating point register 206. Short results are extended to fill the first-operand location by appending 32-zeros on the right.

No conversion occurs if the current FP mode is HFP and the instruction is CONVERT FROM HFP, or if the current FP mode is BFP and the instruction is CONVERT TO BFP. Instead, the second operand is placed unchanged in the first-operand location.

The sign of the result is the sign of the second operand. If the second operand has a sign bit of one and all other operand bits are zeros, the result also is a one followed by all zeros.

If the conversion is to occur for FHER and TBER, and if the biased exponent of the rounded result would be too large to fit into the target format, a data exception (conversion DXC 4) is recognized. If the biased exponent is negative, the result is denormalized, and no exception is recognized. No data exception is recognized when no conversion takes place.

In accordance with the hereinabove described radix conversion instructions, it may therefore be appreciated that these BFP-HFP conversion instructions provide for conversions of data between binary and hexadecimal formats. As defined, the current FP mode determines the radix of the source and the mode named by the instruction determines the radix of the target, or vice versa, depending on the instruction. Conversion from binary to hexadecimal, or from hexadecimal to binary, only takes place when source and target radix differ. If source and target radix are the same, the data are merely moved from the source register to the target register without conversion. For example, CONVERT FROM BFP performs conversions if the current FP mode is HFP, but not if the current mode is BFP. These and other aspects of the radix-conversion instructions are summarized in FIG. 8.

In order to retain full precision, the BFP-HFP conversion instructions convert binary operands in the short format to hexadecimal operands in the long format, rather than converting short to short. Using a long hexadecimal result subsequently as a short operand requires no extra conversion steps.

Conversely, conversion to short binary numbers requires hexadecimal operands in the long format; a short hexadecimal operand should be extended to long by ensuring that the right half of the register is cleared. This avoids unrepeatable rounding errors in the binary result due to "garbage" data left over from previous use. Thus, the entire register should be cleared before loading a short hexadecimal operand from storage for conversion to binary.

Also note that, conversion of finite short binary numbers to the long hexadecimal format is exact. Since both exponent and fraction of the target have sufficient bits, there is no rounding, overflow, or underflow, and nonzero results are normalized.

When conversion takes place, the source and target are governed by the rules of their respective formats, regardless of the current FP mode. Thus, BFP infinities and NaNs are detected if the source operand is in the BFP format. Likewise, the BFP rounding mode applies if the results in the BFP format, and the result is always rounded to zero (truncated) if it is in the HFP format. When no conversion take place, these rules do not apply. No rounding takes place, and special entities are not detected.

When the result of converting the source operand cannot be represented in the target format, a data exception (conversion, DXC 4) is recognized, and a program interruption occurs. This interruption cannot be masked off, so that an exception-handling program may take appropriate action.

The BFP-HFP format-conversion instructions recognize data exceptions with DXC 4. Although the result may actually underflow, overflow, or be inexact, the arithmetic exceptions for those conditions are not used. Instead, standard numeric defaults are supplied to underflow and inexact; and for overflow a program interruption for data occurs. The assumption is that such conversions will generally be performed before or between applications, when a sophisticated application environment with specific exception handlers would not usually be available, but the interruption for conversion makes it convenient to provide installation-defined results where a standard default does not exist.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope and without diminishing its attendant advantages. It is therefore intended that the present invention is not limited to the disclosed embodiments but should be defined in accordance with the claims which follow.

What is claimed is:

1. A computer system including two floating point modes supported by a common set of instructions for implementing operations, program use of said instructions thereby being floating point mode independent, said system comprising:

a storage device including stored information for specifying one of said two floating point modes;

a floating point processor unit adapted to execute an operation based on any one instruction from among said common set of instructions in accordance with the stored floating point mode, thereby providing for floating point mode independent program use of the instructions;

a memory adapted to transfer information to and store information from said floating point processor unit, said memory including associated pairs of stored values, each pair including a first stored value and a second stored value, respectively representing a common number represented in a first floating point format and a second floating point format;

wherein the floating point processor unit executes an instruction for selectively loading an identified storage location with either the first stored value or the second stored value according to the stored floating point mode.

2. The computer system according to claim 1, wherein said floating point processor unit supports binary floating point architecture and hexadecimal floating point architecture as the two floating point modes.

3. The computer system according to claim 1, wherein said floating point processor unit executes an instruction for selectively converting a stored value between a first floating point mode and a second floating point mode according to the stored floating point mode.

4. The computer system according to claim 3, wherein specification of said first floating point format is controlled explicitly by the instruction, and specification of said second floating point format is controlled implicitly according to the stored floating point mode.

5. The computer system according to claim 3, wherein specification of said first floating point format is controlled implicitly according to the stored floating point mode, and specification of said second floating point format is controlled explicitly by the instruction.

* * * * *